April 29, 1952 A. R. REES 2,594,801
POWER SUPPLY FOR RADIO SETS
Filed Feb. 24, 1950

INVENTOR.
ALBERT R. REES
BY
McMorrow, Berman + Davidson
ATTORNEYS

Patented Apr. 29, 1952 2,594,801

UNITED STATES PATENT OFFICE 2,594,801

POWER SUPPLY FOR RADIO SETS

Albert R. Rees, De Soto, Mo.

Application February 24, 1950, Serial No. 145,954

1 Claim. (Cl. 321—8)

This invention relates to power supply circuits for radio receivers, and more particularly to an improved power supply circuit for receivers of the "A. C.–D. C." types.

A main object of the invention is to provide an improved power supply circuit for a radio receiver of the transformerless type, said circuit being very simple in construction, involving only a few parts, and providing substantially automatic regulation of the output voltage of the circuit.

A further object of the invention is to provide an improved power supply circuit for radio receivers of the transformerless type, said power supply circuit combining the function of the pilot light of the receiver with the other elements of the circuit whereby the pilot light serves substantially as a voltage-regulating element.

Further objects and advantages of the invention will become apparent from the following description and claim, and from the accompanying drawings, wherein:

Figure 1:
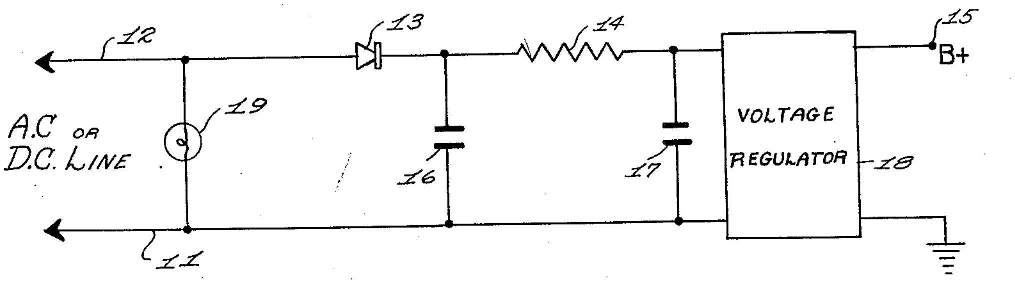
Figure 1 is a schematic wiring diagram illustrating a conventional power supply circuit for a radio receiver of the transformerless type.

Referring to the drawings, and more particularly to Figure 1, it will be seen that the conventional power supply circuit for transformerless radio receivers comprises a first line wire 11 and a second line wire 12, a half-wave rectifier 13 being connected in the second line wire 12 and a smoothing resistor 14 being connected in line wire 12 between the half-wave rectifier 13 and the positive output terminal 15 of the power supply circuit. Connected between the common junction of the rectifier 13 and resistor 14 and the line wire 11 is a first filter condenser 16. Connected between the other terminal of resistor 14 and the line wire 11 is a second filter condenser 17. To maintain a substantially constant voltage across the output terminals of the circuit, a voltage regulator, shown at 18 in block form, is employed. Said voltage regulator may comprise a conventional voltage regular tube connected across the output circuit of the power supply. The pilot light of the receiver, designated at 19, may be connected across the line wires 11 and 12, as shown in Figure 1.

Figure 2:
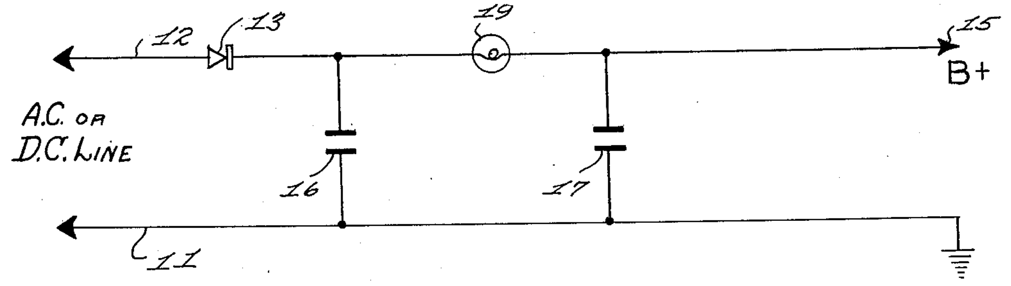
Figure 2 is a wiring diagram illustrating an improved power supply circuit for transformerless radio receivers constructed in accordance with the present invention.

Referring now to Figure 2, in accordance with the present invention, the pilot light 19 is utilized as a voltage regulator by substituting said pilot light for the smoothing resistor 14 of Figure 1, as shown in Figure 2. In the circuit of Figure 2, the respective line wires are shown at 11 and 12, and the half-wave rectifier 13 is connected in series with the pilot light 19, the first filter condenser 16 being connected between the common junctions of the rectifier 13 and pilot light 19 and the line wire 11. The second filter condenser 17 is connected between the other terminal of the pilot light 19 and the line wire

11, as shown. The resistance characteristics of the pilot light are such that its resistance increases when the current therethrough increases, whereby the pilot light acts as a ballast resistor and provides an increased voltage drop therethrough when the line voltage across the input terminals of the line wires 11 and 12 tends to increase. The pilot light 19 therefore acts as a voltage regulator, eliminating the requirements for any additional voltage regulator, such as the regulator 18 employed in Figure 1. It is therefore seen that the circuit of Figure 2 produces substantially the same result as the circuit of Figure 1, but requires only four electrical components in comparison with the six electrical components required in Figure 1. In the circuit of Figure 2, the pilot light 19 performs its usual function, and at the same time serves as a ballast resistor in the power supply circuit to maintain the output voltage of said power supply circuit at a substantially constant value.

While a specific embodiment of an improved power supply circuit for transformerless radio receivers has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In an A. C.–D. C. radio receiver of the transformerless type, a plate power supply circuit comprising a first line conductor and a second line conductor adapted to be connected to a house lighting line, a half-wave rectifier and a pilot lamp connected in series with said first line conductor, said rectifier being connected ahead of said lamp, a first filter condenser connected between the common junction of said rectifier and lamp and said second conductor, and a second filter condenser connected between the terminal of the lamp opposite said junction and the second line conductor, said lamp being arranged to act as a smoothing resistor between the two filter condensers, and also acting as a voltage regulator to compensate for variations in line voltage across the first and second line conductors, as well as serving to indicate that current is flowing in the power supply circuit.

ALBERT R. REES.

REFERENCES CITED

The following references are of record in the file of this patent:

UNITED STATES PATENTS

| Number | Name | Date |
|---|---|---|
| 1,094,733 | Lyle | Apr. 28, 1914 |
| 1,548,952 | Mills | Aug. 11, 1925 |
| 1,615,098 | Purschel | Jan. 18, 1927 |
| 1,771,330 | Grimditch | July 22, 1930 |
| 1,829,603 | Mulder et al. | Oct. 27, 1931 |
| 1,852,893 | Mulder | Apr. 5, 1932 |